US010979122B2

United States Patent
Jeon et al.

(10) Patent No.: US 10,979,122 B2
(45) Date of Patent: Apr. 13, 2021

(54) WIRELESS COMMUNICATION APPARATUS FOR ADAPTIVE BEAMFORMING AND METHOD OF OPERATION THEREOF

(71) Applicant: Samsung Electronics Co., Ltd., Suwon-si (KR)

(72) Inventors: Eunsung Jeon, Seoul (KR); Wookbong Lee, San Jose, CA (US); Sungsoo Kim, Seoul (KR); Joonsuk Kim, Seoul (KR); Minki Ahn, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 16/825,185

(22) Filed: Mar. 20, 2020

(65) Prior Publication Data
US 2020/0304194 A1 Sep. 24, 2020

(30) Foreign Application Priority Data

Mar. 21, 2019 (KR) ........................ 10-2019-0032541
Jun. 4, 2019 (KR) ........................ 10-2019-0066060

(51) Int. Cl.
*H04B 7/06* (2006.01)
*H04B 17/336* (2015.01)
*H04W 16/28* (2009.01)

(52) U.S. Cl.
CPC ......... *H04B 7/0626* (2013.01); *H04B 7/0617* (2013.01); *H04B 17/336* (2015.01); *H04W 16/28* (2013.01)

(58) Field of Classification Search
CPC .. H04B 7/0617; H04B 7/0421; H04B 7/0626; H04B 7/0408; H04B 7/0413;
(Continued)

(56) References Cited

U.S. PATENT DOCUMENTS 7,830,840 B2    11/2010 Jung et al.
8,718,192 B2    5/2014 Ko et al.
(Continued)

FOREIGN PATENT DOCUMENTS

KR   10-2013-0046461 A   5/2013
KR   10-2015-0040331 A   4/2015
(Continued)

OTHER PUBLICATIONS

Stefan Schwarz, et al., "Calculation of the Spatial Preprocessing and Link Adaptation Feedback for 3GPP UMTS/LTE," Jun. 27-29, 2010, Wireless Advanced 2010 (IEEE), London, UK.
(Continued)

*Primary Examiner* — Khanh C Tran
(74) *Attorney, Agent, or Firm* — Harness, Dickey & Pierce, P.L.C.

(57) ABSTRACT

A method of operating a wireless communication apparatus, the method comprising: estimating a first channel using a sounding packet received from a base station to obtain an estimated first channel, the sounding packet including a plurality of first streams, generating a diagonal matrix and a beam steering matrix by performing singular value decomposition (SVD) on the estimated first channel, generating state information of a plurality of second channels respectively corresponding to a plurality of second streams generated by applying the beam steering matrix to the plurality of first streams using the diagonal matrix, and transmitting beamforming feedback based on the state information to the base station.

20 Claims, 15 Drawing Sheets

(58) Field of Classification Search
CPC .. H04B 7/0619; H04B 7/0663; H04B 7/0695; H04B 17/336; H04L 25/0204; H04L 25/0202; H04L 25/0242; H04L 2025/03426; H04L 25/0228; H04W 16/28
See application file for complete search history.

(56) References Cited

U.S. PATENT DOCUMENTS

| | | | |
|---|---|---|---|
| 8,798,184 | B2 | 8/2014 | Su et al. |
| 9,253,009 | B2 | 2/2016 | Steele et al. |
| 9,960,826 | B2 | 5/2018 | Xiong et al. |
| 9,985,709 | B2 | 5/2018 | Park et al. |
| 10,075,319 | B2 | 9/2018 | Zhang et al. |
| 10,277,442 | B2 | 4/2019 | Kim et al. |
| 10,601,486 | B1 * | 3/2020 | Roy .................. H04B 7/0417 |
| 2013/0308713 | A1 * | 11/2013 | Zhang ................ H04B 7/0697 375/267 |
| 2016/0173179 | A1 * | 6/2016 | Zhang ................ H04B 7/0413 370/329 |
| 2018/0262244 | A1 | 9/2018 | Noh et al. |
| 2020/0106492 | A1 * | 4/2020 | Cao .................... H04B 7/0421 |
| 2020/0112350 | A1 * | 4/2020 | Yang .................. H04B 7/088 |
| 2020/0136700 | A1 * | 4/2020 | Bogale ............... H04B 7/0658 |

FOREIGN PATENT DOCUMENTS

| | | |
|---|---|---|
| KR | 10-2015-0135217 A | 12/2015 |
| KR | 10-2017-0126448 A | 11/2017 |
| KR | 10-2018-0102322 A | 9/2018 |

OTHER PUBLICATIONS

Jonna et al., :Rank and MIMO Mode Adaptation in LTE, IEEE International Conference on Advanced Networks and Telecommunications System, May 5, 2014, pp. 1-6.

IEEE Std. 802.11—Part11: WLAN MAC and PHY specification.

* cited by examiner

WIRELESS COMMUNICATION APPARATUS FOR ADAPTIVE BEAMFORMING AND METHOD OF OPERATION THEREOF

CROSS-REFERENCE TO RELATED APPLICATIONS

This application claims the benefit under 35 U.S.C. § 119 of Korean Patent Application Nos. 10-2019-0032541, filed on Mar. 21, 2019, and 10-2019-0066060, filed on Jun. 4, 2019, in the Korean Intellectual Property Office, the disclosures of which are incorporated herein in their entireties by reference.

BACKGROUND

The inventive concepts relate to wireless communication apparatuses, and more particularly, to wireless communication apparatuses for supporting adaptive beamforming of a base station and methods of operation thereof.

A multiple antenna-based wireless communication system may improve a data transmission rate through beamforming between a transmitter and a receiver in a cellular communication environment. A beamforming method is performed based on a channel state between the base station and the wireless communication apparatus and, in general, may be a method of generating a beam steering matrix using a channel estimated as a reference signal in the wireless communication apparatus (or the receiver) and feeding back information (e.g., a codebook) about the beam steering matrix to the base station (or the transmitter).

Wireless communication apparatuses capable of supporting beamforming technology for improving the performance of a wireless communication system have been studied and, in order to determine a method of beamforming suitable for the channel state between the base station and the wireless communication apparatus, research into beamforming feedback generation methods of wireless communication apparatuses is being conducted.

SUMMARY

The inventive concepts provide a wireless communication apparatus capable of generating beamforming feedback that more accurately reflects a channel state experienced by a received signal of a wireless communication apparatus supporting beamforming and a method of operation thereof.

According to an aspect of the inventive concepts, there is provided a method of operating a wireless communication apparatus, the method comprising: estimating a first channel using a sounding packet received from a base station to obtain an estimated first channel, the sounding packet including a plurality of first streams, generating a diagonal matrix and a beam steering matrix by performing singular value decomposition (SVD) on the estimated first channel, generating state information of a plurality of second channels respectively corresponding to a plurality of second streams generated by applying the beam steering matrix to the plurality of first streams using the diagonal matrix, and transmitting beamforming feedback based on the state information to the base station.

According to an aspect of the inventive concepts, there is provided a method of operating a wireless communication apparatus, the method comprising: generating a diagonal matrix and a beam steering matrix by performing singular value decomposition on a channel matrix corresponding to a first channel between a base station and the wireless communication apparatus, the diagonal matrix including a plurality of singular values, determining a plurality of signal to noise ratios (SNRs) corresponding to a plurality of second channels over which are received a plurality of beam steering streams to which the beam steering matrix is applied using the diagonal matrix, and providing beamforming feedback including the plurality of SNRs and the beam steering matrix to the base station.

According to an aspect of the inventive concepts, there is provided a beamforming method in a wireless communication system including a base station and a wireless communication apparatus, the beamforming method including: generating, by the wireless communication apparatus, a diagonal matrix and a beam steering matrix by performing singular value decomposition on a first channel estimated using a sounding packet received from the base station, the sounding packet including a plurality of first streams, generating, by the wireless communication apparatus, state information of at least one target channel among a plurality of second channels corresponding to a plurality of second streams generated by applying the beam steering matrix to the plurality of first streams, transmitting, by the wireless communication apparatus, beamforming feedback based on the state information to the base station; and determining, by the base station, a number of beamforming ranks for wireless communication with the wireless communication apparatus based on the beamforming feedback.

According to an aspect of the inventive concepts, there is provided a wireless communication apparatus including: a plurality of antennas configured to support beamforming, and processing circuitry configured to, estimate a first channel using a sounding packet received from a base station, the sounding packet including a plurality of first streams to obtain an estimated first channel, perform singular value decomposition on the estimated first channel to generate a diagonal matrix and a beam steering matrix, generate state information of at least one target channel among a plurality of second channels corresponding to a plurality of second streams generated by applying the beam steering matrix to the plurality of first streams such that the state information is usable for determining a number of beamforming ranks, and generate beamforming feedback based on the state information for transmission to the base station.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF EMBODIMENTS

Hereinafter, embodiments of the inventive concepts will be described in detail with reference to the accompanying drawings.

Figure 1:
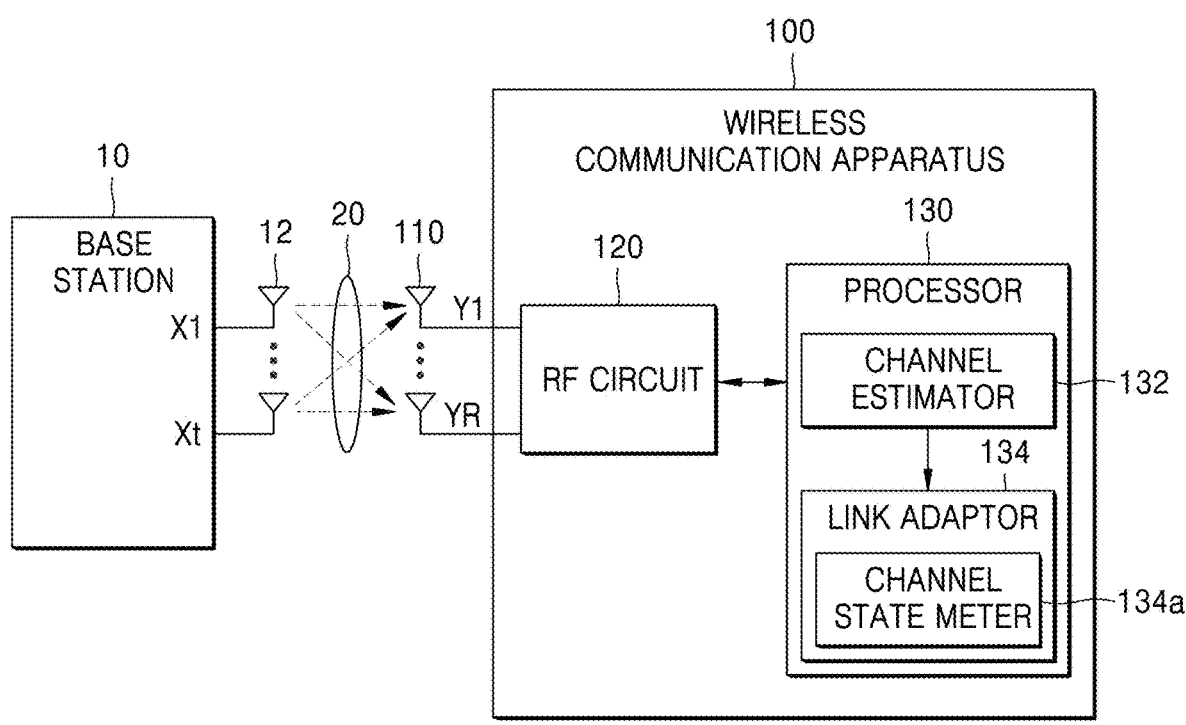
FIG. 1 is a block diagram of a wireless communication system according to an embodiment.

FIG. 1 is a block diagram schematically illustrating a wireless communication system 1 according to an embodiment.

Referring to FIG. 1, the wireless communication system 1 may include a wireless communication apparatus 100 and/or a base station 10, and the wireless communication apparatus 100 and the base station 10 may communicate with each other through a first channel 20. The wireless communication system 1 may be referred to as a multi-input multi-output (MIMO) system. The wireless communication system 1 may be, though is not limited to, a long term evolution (LTE) system, a code division multiple access (CDMA) system, a global system for mobile communications (GSM) system, a wireless local area network (WLAN) system, and/or any other wireless communication system. The wireless communication system 1 may support a modulation method and/or an adaptive modulation & coding (AMC) method for determining a channel coding rate, according to a state of the first channel 20. The wireless communication system 1 may include t transmitting antennas 12 (e.g., transmitting antennas 12 X1 through Xt) and R receiving antennas 110 (receiving antennas 110 Y1 through YR).

The wireless communication apparatus 100 may be referred to as one or more of various apparatuses that may communicate with the base station 10 to transmit and/or receive data and/or control information. For example, the wireless communication apparatus 100 may be referred to as user equipment (UE), a mobile station (MS), a mobile terminal (MT), a user terminal (UT), a subscriber station (SS), a mobile device, and/or the like. Furthermore, the base station 10 may be referred to as a fixed station that communicates with the wireless communication apparatus 100 and/or another base station, and may communicate with the wireless communication apparatus 100 and/or other base station to transmit and/or receive data. For example, the base station 10 may be referred to as a Node B, an evolved-Node B (eNB), a base transceiver system (BTS), and/or an access point (AP).

A wireless communication network between the wireless communication apparatus 100 and the base station 10 may support communication between a plurality of users by sharing available network resources. For example, in the wireless communication network, information may be transmitted in various ways such as code division multiple access (CDMA), frequency division multiple access (FDMA), time division multiple access (TDMA), orthogonal frequency division multiple access (OFDMA), single carrier frequency division multiple access (SC-FDMA), and/or the like.

In the following, it is assumed that the wireless communication system 1 is a wireless local area network system, and it is assumed that the same modulation and coding scheme or a similar modulation and coding scheme is supported for each stream. However, this is only an embodiment, and the inventive concepts are not limited thereto. The spirit of the disclosure may be applicable to various network systems.

The wireless communication apparatus 100 may include a plurality of antennas (or receiving antennas) 110, a radio frequency (RF) circuit 120, and/or a processor 130. Each of the components included in the wireless communication apparatus 100 (e.g., the RF circuit 120 and/or the processor 130) may be a hardware block including an analog circuit and/or a digital circuit and may be a software block including a plurality of commands executed by a processor. The RF circuit 120 may receive a signal (e.g., a downlink signal) from the base station 10 through the plurality of antennas 110. The RF circuit 120 may include an analog down-conversion mixer and may generate a baseband signal by down-converting the received signal using the analog down-conversion mixer. In addition, the RF circuit 120 may further include an analog-to-digital converter to perform a processing operation such as converting the baseband signal into a digital signal. According to some example embodiments, the RF circuit 120 may be implemented using structures and/or methods as would be understood by a person of ordinary skill in the art.

The processor 130 may include a channel estimator 132 and/or a link adaptor 134. Hereinafter, although the channel estimator 132 and the link adaptor 134 are illustrated as separate blocks included in the processor 130, the channel estimator 132 and the link adaptor 134 are not limited thereto. The blocks may be an integrated logic block capable of performing a series of operations. According to some example embodiments, operations described herein as being performed by the wireless communication apparatus 100, the base station 10, the processor 130, the channel estimator 132 and/or the link adaptor 134 may be performed by processing circuitry. The term 'processing circuitry,' as used in the present disclosure, may refer to, for example, hardware including logic circuits; a hardware/software combination such as at least one processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The channel estimator 132 may estimate the first channel 20 by using a reference signal included in a sounding packet received from the base station 10. The sounding packet may be transmitted as a signal by the base station 10 to the wireless communication apparatus 100 to perform beamforming suitable for the state of the first channel 20 and may be referred to as a null data packet. The sounding packet may be composed of a plurality of first streams (also referred to herein as "a plurality of sounding streams"). The wireless communication apparatus 100 may generate beamforming feedback (e.g., beamforming feedback information, signals and/or data) indicating the state of the first channel 20 by using the sounding packet and may transmit the generated beamforming feedback to the base station 10.

The link adaptor 134 according to an embodiment may include a channel state meter 134a. The link adaptor 134 may generate a diagonal matrix and a beam steering matrix by performing singular value decomposition (SVD) on an estimated channel (e.g., the first channel 20). The channel state meter 134a may generate state information of second channels corresponding to a plurality of second streams (also referred to herein as "a plurality of beamforming streams") generated (e.g., by the base station 10) by applying the beam steering matrix to the first streams of the sounding packet using the diagonal matrix. In more detail, the channel state meter 134a may individually generate a channel state for each second channel. According to some example embodiments, the channel state for each second channel may be included in the generated state information of the second channels. In an embodiment, the channel state may be a signal to noise ratio (SNR) and/or a signal to interference plus noise ratio (SINR) corresponding to each of the second channels. The second channels corresponding to the second streams will be described later below in detail with reference to FIG. 4. According to some example embodiments, operations described herein as being performed by the channel state meter 134a may be performed by processing circuitry.

The link adaptor 134 may transmit beamforming feedback including the state information of the second channels to the base station 10. The base station 10 according to an embodiment may determine the number of beamforming ranks by selectively using some information from the state information of the second channels. In more detail, the base station 10 may determine the number of beamforming ranks by first checking a channel state that may degrade beamforming performance among the state information of the second channels. The base station 10 may perform wireless communication with the wireless communication apparatus 100 by performing beamforming based on the determined number of beamforming ranks. The number of ranks may also be referred to as a channel coefficient.

The link adaptor 134 according to an embodiment may determine the number of appropriate ranks by selectively using some information among the state information of the second channels, and the link adaptor 134 may generate a rank indicator indicating the number of appropriate ranks. In more detail, the link adaptor 134 may determine the number of beamforming ranks by first checking a channel state that may degrade beamforming performance among the state information of the second channels. The number of ranks may correspond to the number of layers to which a transport block is mapped when the base station 10 transmits at least one transport block to the wireless communication apparatus 100. The number of layers may vary according to the states of the second channels, and the link adaptor 134 may transmit beamforming feedback including the rank indicator to the base station 10. Here, the base station 10 may determine the number of beamforming ranks by referring to the rank indicator.

The wireless communication apparatus 100 according to embodiments may generate beamforming feedback for determining the number of beamforming ranks by first identifying the state of at least one channel that may negatively affect beamforming performance among the second channels corresponding to streams generated by applying the beam steering matrix. As a result, the base station 10 may perform beamforming control considering the bad channel state based on the beamforming feedback, thereby improving the beamforming performance of the wireless communication system 1.

Figure 2:
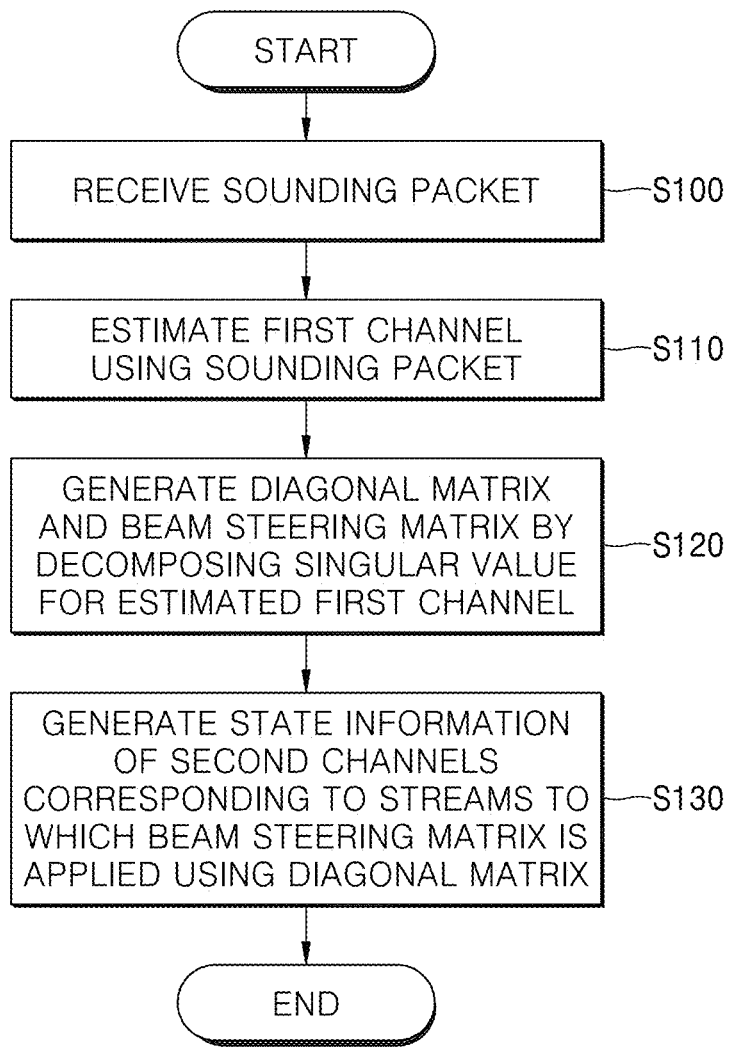
FIG. 2 is a flowchart of a beamforming feedback generation method of a wireless communication apparatus, according to an embodiment.

FIG. 2 is a flowchart illustrating a beamforming feedback generation method of the wireless communication apparatus 100 according to an embodiment.

Referring to FIG. 2, in operation S100, the wireless communication apparatus 100 may receive a sounding packet from the base station 10. In operation S110, the wireless communication apparatus 100 may estimate a first channel (e.g., the first channel 20) using the sounding packet. In operation S120, the wireless communication apparatus 100 may generate a diagonal matrix and a beam steering matrix by decomposing a singular value for the estimated first channel. In operation S130, the wireless communication apparatus 100 may generate state information of second channels (e.g., second channels generated and transmitted to the wireless communication apparatus 100 by the base station 10) corresponding to streams to which the beam steering matrix is applied using the diagonal matrix. The wireless communication apparatus 100 may transmit beamforming feedback including the state information of the second channels to the base station 10. The base station 10 may determine the number of beamforming ranks based on the beamforming feedback. Details of the diagonal matrix, the beam steering matrix, and the state information of the second channels will be described later below with reference to FIGS. 3 and 4.

Figure 3:
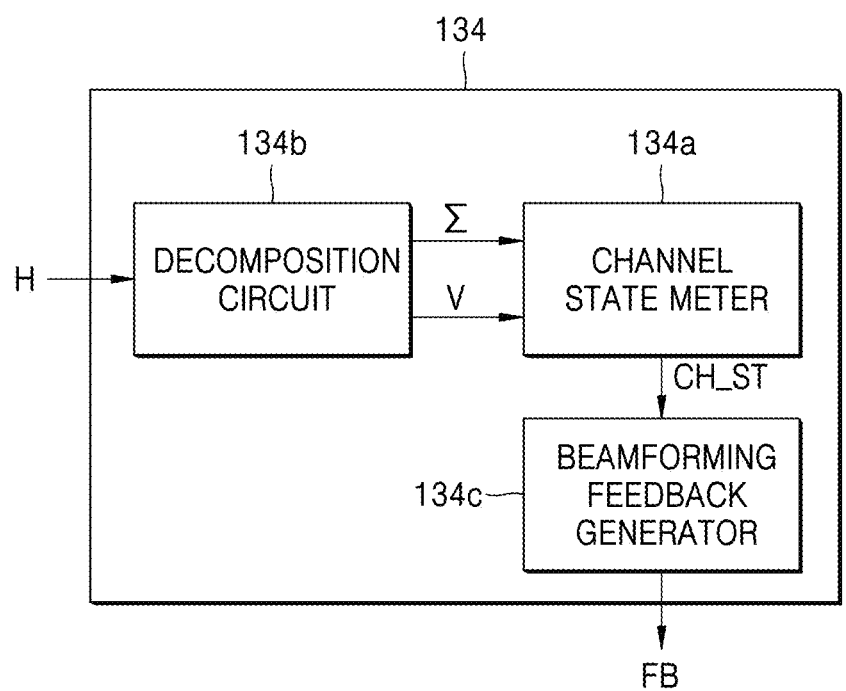
FIG. 3 is a block diagram of an operation of a link adaptor according to an embodiment.
Figure 4:
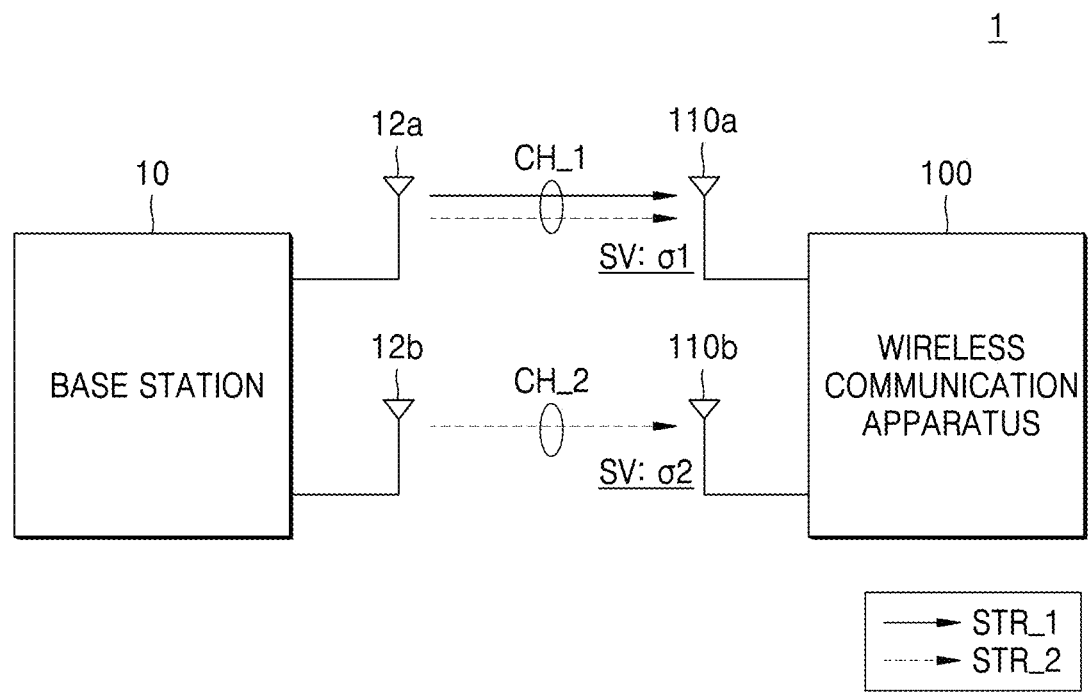
FIG. 4 is a block diagram illustrating a method of generating beamforming feedback in a wireless communication system that is a rank-2 wireless local area network system.

FIG. 3 is a block diagram of an operation of the link adaptor 134 according to an embodiment, and FIG. 4 is a view illustrating a method of generating beamforming feedback in the wireless communication system 1 that is a rank-2 wireless local area network system.

Referring to FIG. 3, the link adaptor 134 may include the channel state meter 134a, a decomposition circuit 134b, and/or a beamforming feedback generator 134c. Before describing the configuration of FIG. 3, the diagonal matrix and the beam steering matrix will be described below with reference to FIG. 1. According to some example embodiments, operations described herein as being performed by the decomposition circuit 134b and/or the beamforming feedback generator 134c may be performed by processing circuitry.

Further referring to FIG. 1, first, when the base station 10 transmits signals X1 and X2 composed of a plurality of streams through the transmitting antennas 12, the wireless communication apparatus 100 may receive signals Y1 and Y2 through the receiving antennas 110. The received signals Y1 and Y2 are the result of experiencing the first channel 20 (e.g., the received signals Y1 and Y2 may be different from the transmitted signals X1 and X2 based on the influence of the first channel 20), and the relationship between the transmitted signals X1 and X2 and the received signals Y1 and Y2 is given by the following Equation (1).

$$Y = H \cdot X + N \qquad (1)$$

Each element of Equation 1 may be a vector or a matrix. 'N' indicates white Gaussian noise, and 'Y' indicates the received signals Y1 and Y2 and may be a 2×1 matrix. 'X' indicates the transmitted signals X1 and X2 and may be a 2×1 matrix. 'H' indicates a channel matrix and may be a 2×2 matrix. 'H' indicates a frequency response between the base station 10 and the wireless communication apparatus 100. The channel estimator 132 may generate a channel matrix H by estimating the first channel 20.

The link adaptor 134 may perform singular value decomposition on the channel matrix H e.g., the estimated first channel 20). For example, the link adaptor 134 may perform singular value decomposition with respect to the channel matrix H as shown in Equation (2) below.

$$H = U\Sigma V^* \quad (2)$$

'U' and 'V' may be unitary matrices, and 'Σ' may be a diagonal matrix including non-negative singular values (e.g., σ1 and σ2) of the first channel 20. 'V*' may be a conjugate transpose matrix of 'V'. Also, 'U*' may be a conjugate transpose matrix of 'U', and the link adaptor 134 may apply 'U*' to the channel matrix H. In addition, the link adaptor 134 may generate 'V' using 'V*', and 'V' may indicate a beam steering matrix. The link adaptor 134 may generate a precoding matrix indicator PMI based on the beam steering matrix V. The wireless communication apparatus 100 may perform adaptive beamforming based on the precoding matrix indicator PMI. Accordingly, the relationship between the transmitted signals X1 and X2 and the received signals Y1 and Y2 is given by Equation 3 below.

$$Y = H \cdot V \cdot X + N \quad (3)$$

The link adaptor 134 may apply 'U*' to 'Y' in Equation 3, and as a result, Equation 4 may be derived as follows.

$$Y' = U^*Y = U^*(H \cdot V \cdot X + N) = U^* \cdot (U\Sigma V^* \cdot V \cdot X + N) = \Sigma X + N' \quad (4)$$

As such, as a result of adaptive beamforming performed by the base station 10, the signals Y1 and Y2 received by the wireless communication apparatus 100 (e.g., Y') may be defined as singular values of the first channel 20 and noise N' is reflected in the transmitted signals X1 and X2.

Referring again to FIG. 3, the decomposition circuit 134b may receive the channel matrix H and perform singular value decomposition on the channel matrix H to generate the beam steering matrix V and the diagonal matrix Σ and provide the beam steering matrix V and the diagonal matrix Σ to the channel state meter 134a. The channel state meter 134a may provide the beamforming feedback generator 134c with channel state information CH_ST generated by measuring the states of second channels corresponding to streams to which the beam steering matrix V is applied (e.g., by the base station 10). As a method of measuring the states of the second channels, according to an embodiment, an SNR measuring method may be applied. In more detail, the channel state meter 134a may calculate and/or determine SNRs corresponding to the second channels by obtaining singular values respectively corresponding to the second channels from the diagonal matrix Σ. The channel state meter 134a may provide the calculated SNRs to the beamforming feedback generator 134c as the states of the second channels. The singular values respectively corresponding to the streams and the second channels to which the beam steering matrix V is applied will be described later below with reference to FIG. 4.

Further referring to FIG. 4, the wireless communication system 1 may include the base station 10 and/or the wireless communication apparatus 100, wherein the base station 10 may include two transmitting antennas 12a and 12b, and/or the wireless communication apparatus 100 may include two receiving antennas 110a and 110b. The streams to which the beam steering matrix V is applied may include stream-1 STR_1 and stream-2 STR_2. Second channels CH_1 and CH_2 (also referred to herein as channel-1 CH_1 and channel-2 CH_2) corresponding to the streams to which the beam steering matrix V of FIG. 4 is applied may be based on the singular values of the diagonal matrix Σ.

The stream-1 STR_1 may be transmitted to the wireless communication apparatus 100 only through the channel-1 CH_1. Accordingly, the stream-1 STR_1 may correspond to the number of ranks of '1'. A portion of the stream-2 STR_2 may be transmitted to the wireless communication apparatus 100 through the channel-1 CH_1 and the other portion of the stream-2 STR_2 may be transmitted to the wireless communication apparatus 100 through the channel-2 CH_2. Accordingly, the stream-2 STR_2 may correspond to the number of ranks of '2'.

The channel-1 CH_1 may include a plurality of sub channels, and singular values SV respectively corresponding to the sub channels of the channel-1 CH_1 may be referred to as the first singular values σ1. In other words, the stream-1 STR_1 may be transmitted through a plurality of sub carriers corresponding to the channel-1 CH_1, and the first singular values σ1 may be the singular values SV corresponding to the sub carriers.

The channel-2 CH_2 may include a plurality of sub channels, and the singular values SV respectively corresponding to the sub channels of the channel-2 CH_2 may be referred to as the second singular values σ2. In other words, a portion of the stream-2 STR_2 may be transmitted through a plurality of sub carriers corresponding to the channel-2 CH_2, and the second singular values σ2 may be the singular values SV corresponding to the sub carriers.

Considering the characteristics of the second channels CH_1 and CH_2 corresponding to the streams STR_1 and STR_2 generated by applying the beam steering matrix V, the second singular values σ2 may be less than the first singular values σ1. Accordingly, the state of channel-2 CH_2 may not be as good as that of the channel-1 CH_1. Indeed, it is characteristic of singular value decomposition that, when the difference in singular values between channels is large, most packet errors occur in the stream corresponding to the highest number of ranks (also referred to herein as the "highest ranking stream"). Nevertheless, to take into account the state of channel-1 CH_1 and the state of channel-2 CH_2 as a whole, for example, conventional wireless communication apparatuses generate the channel capacity (the channel capacity corresponds to the average of the state of the channel-1 CH_1 and the state of the channel-2 CH_2) in which the state of the channel-1 CH_1 and the state of the channel-2 CH_2 are combined and provides the channel capacity to the base station 10, or determines the number of appropriate ranks based on the combined channel capacity. As a result, even when the state of the channel-2 CH_2 is degraded, when the state of the channel-1 CH_1 is good (e.g., not degraded and/or less degraded), the number of beamforming ranks may be determined as '2'. In this case, as described above, since the wireless communication system supports the same modulation and coding scheme or a similar modulation and coding scheme for each stream, it is difficult to separately apply a modulation and a coding scheme corresponding to the degraded channel-2 CH_2. As a result, the conventional wireless communication apparatuses may decrease the beamforming performance (e.g., increase transmission errors and/or reduce transmission speed) of the entire wireless communication system because the probability of decoding failure for some streams received through the channel-2 CH_2 increases.

However, the wireless communication apparatus 100 according to an embodiment may generate beamforming feedback to determine the number of beamforming ranks by selectively considering the state of the channel over which the highest ranking stream is received (e.g., the channel-2 CH_2), which may negatively affect beamforming performance, among the states of the second channels CH_1 and CH_2 and may provide the generated beamforming feedback to the base station 10. In addition, the wireless communication apparatus 100 may determine the number of appropriate ranks considering the state of the channel-2 CH_2, may generate a rank indicator, and may provide the rank indicator to the base station 10. According to some example embodiments, the number of beamforming ranks may be determined so as to exclude or reduce transmission via the channel over which the highest ranking stream is received (e.g., the channel-2 CH_2) when that channel is degraded. Accordingly, transmission over a degraded channel is prevented or reduced, thereby increasing beamforming performance (e.g., decrease transmission errors and/or increase transmission speed) as compared to the conventional wireless communication apparatuses (e.g., by decreasing the probability of decoding failure of streams that would otherwise be received over the degraded channel).

The channel state meter 134a according to an embodiment may calculate an SNR corresponding to the channel-1 CH_1 as the state of the channel-1 CH_1. In more detail, the channel state meter 134a may calculate a first SNR for the stream-1 STR_1 received through the channel-1 CH_1 using the first singular value $\sigma 1$. According to some example embodiments, the channel state meter 134a may calculate the SNR values for the stream-1 STR_1 based on the singular value $\sigma 1$ using structures and/or methods that would be known to a person having ordinary skill in the art. In addition, the channel state meter 134a may calculate an SNR corresponding to the channel-2 CH_2 as the state of the channel-2 CH_2. In more detail, the channel state meter 134a may calculate a second SNR for the stream-2 STR_2 received through the channel-2 CH_2 using the second singular values $\sigma 2$. According to some example embodiments, the channel state meter 134a may calculate the SNR values for the stream-2 STR_2 based on the singular value $\sigma 2$ using structures and/or methods that would be known to a person having ordinary skill in the art.

The channel state meter 134a may provide the channel state information CH_ST including the first SNR and the second SNR to the beamforming feedback generator 134c. The beamforming feedback generator 134c may generate beamforming feedback FB including the first SNR and the second SNR and transmit the beamforming feedback FB to the base station 10 (see, e.g., FIG. 3). According to some embodiments, the channel state meter 134a may generate the beamforming feedback FB to include only the second SNR of the channel-2 CH_2 based on the determination of the number of beamforming ranks, among the second channels CH_1 and CH_2, to provide the second SNR of the channel-2 CH_2 to the beamforming feedback generator 134c.

The base station 10 according to an embodiment may compare the second SNR, which is lower than the first SNR, among the first SNR and the second SNR, with a reference value to determine the number of beamforming ranks based on the comparison result. For example, the base station 10 may determine that the state of the channel-2 CH_2 is suitable for transmitting signals when the second SNR is equal to or greater than the reference value and may determine the number of beamforming ranks as '2', which is the number of ranks corresponding to the channel-2 CH_2. In addition, the base station 10 may determine that the state of the channel-2 CH_2 is not suitable for transmitting signals when the second SNR is less than the reference value and may determine the number of beamforming ranks as '1', which is one step (e.g., rank) lower than the number of ranks corresponding to the channel-2 CH_2.

The reference value according to an embodiment may be determined based on a MIMO scheme between the base station 10 and the wireless communication apparatus 100. In more detail, the reference value may be determined according to the number of antennas used for MIMO (or beamforming) of the base station 10 and the number of antennas used for beamforming of the wireless communication apparatus 100. This will be described later below with reference to FIGS. 10A and 10B.

Figure 5:
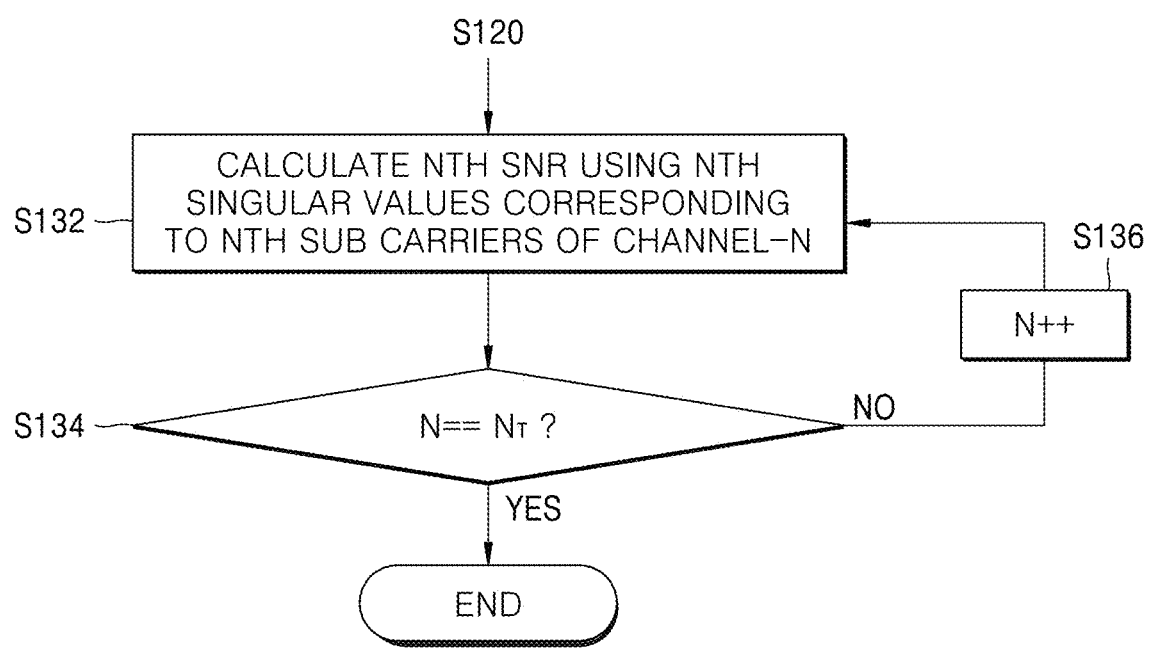
FIG. 5 is a flowchart of an operation of a channel state meter of FIG. 3, according to an embodiment.

FIG. 5 is a flowchart illustrating an operation of the channel state meter 134a of FIG. 3, according to an embodiment.

Referring to FIGS. 3 and 5, in operation S132, the channel state meter 134a may calculate an $N^{th}$ SNR for a channel-N using $N^{th}$ singular values corresponding to $N^{th}$ sub carriers of the channel-N. According to some example embodiments, operation S132 may include an initialization operation in which the channel state meter 134a sets "N" to have an initial value, such as '1', prior to calculating the $N^{th}$ SNR. In operation S134, the channel state meter 134a may determine whether 'N' is the total number $N_T$ of the second channels. When operation S134 is "No", operation S132 may be continued after the channel state meter 134a counts up (e.g., increments) "N". Otherwise, when operation S134 is 'Yes', the channel state meter 134a may provide the channel state information CH_ST including SNRs of the second channels to the beamforming feedback generator 134c.

Figure 6:
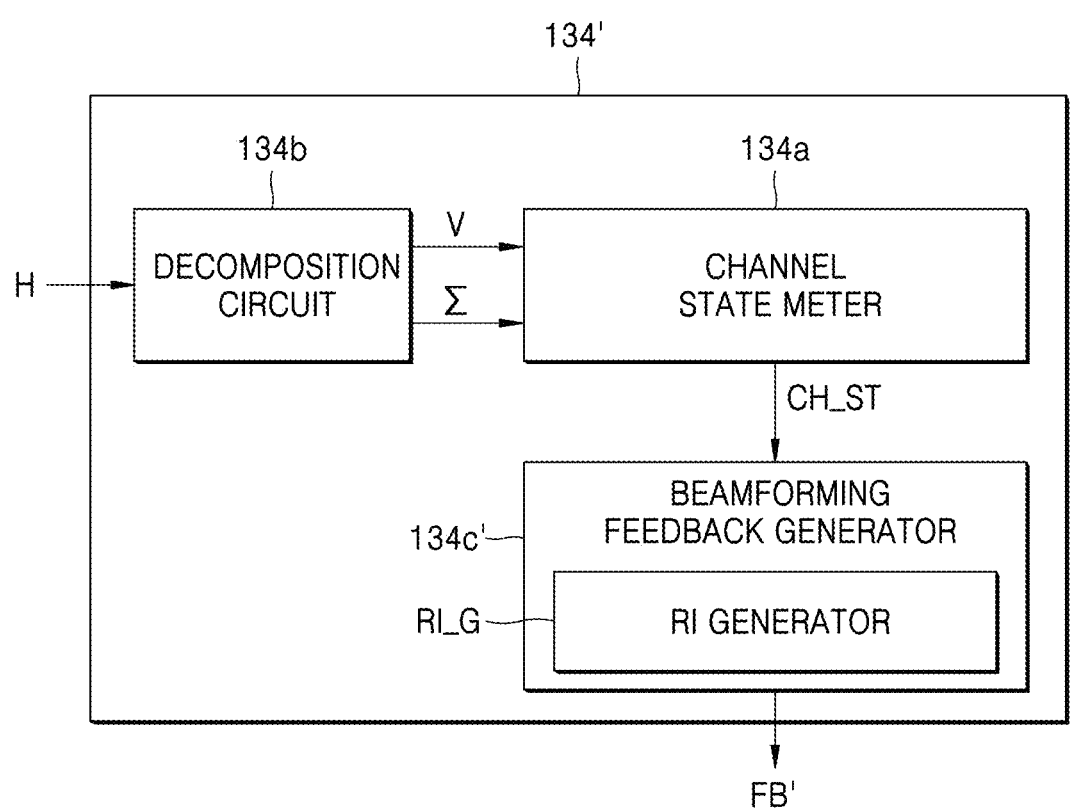
FIG. 6 is a block diagram of an operation of a link adaptor according to an embodiment.

FIG. 6 is a block diagram of an operation of the link adaptor 134' according to an embodiment. The link adaptor 134' of FIG. 6 is the same as or similar to the link adaptor 134 of FIG. 3, with the exception of a beamforming feedback generator 134c' of FIG. 6. Redundant description between FIGS. 3 and 6 is omitted.

Referring to FIG. 6, the beamforming feedback generator 134c' of the link adaptor 134' may further include a rank indicator generator RI_G, compared to FIG. 3. The rank indicator generator RI_G according to an embodiment may generate a rank indicator based on the channel state information CH_ST. For example, on the premise of the descriptions given above with reference to FIG. 4, the rank indicator generator RI_G compares the second SNR, which is lower than the first SNR, among the first SNR and the second SNR, with a reference value to determine the number of appropriate ranks based on the comparison result. For example, the rank indicator generator RI_G may determine that the state of the channel-2 CH_2 is suitable for transmitting signals when the second SNR is equal to or greater than the reference value and may determine the number of appropriate ranks as '2', which is the number of ranks corresponding to the channel-2 CH_2. In addition, the rank indicator generator RI_G may determine that the state of the channel-2 CH_2 is not suitable for transmitting signals when the second SNR is less than the reference value and may determine the number of appropriate ranks as '1', which is one step (e.g., rank) lower than the number of ranks corresponding to the channel-2 CH_2. According to some example embodiments, operations described herein as being performed by the rank indicator generator RI_G may be performed by processing circuitry.

Figure 7:
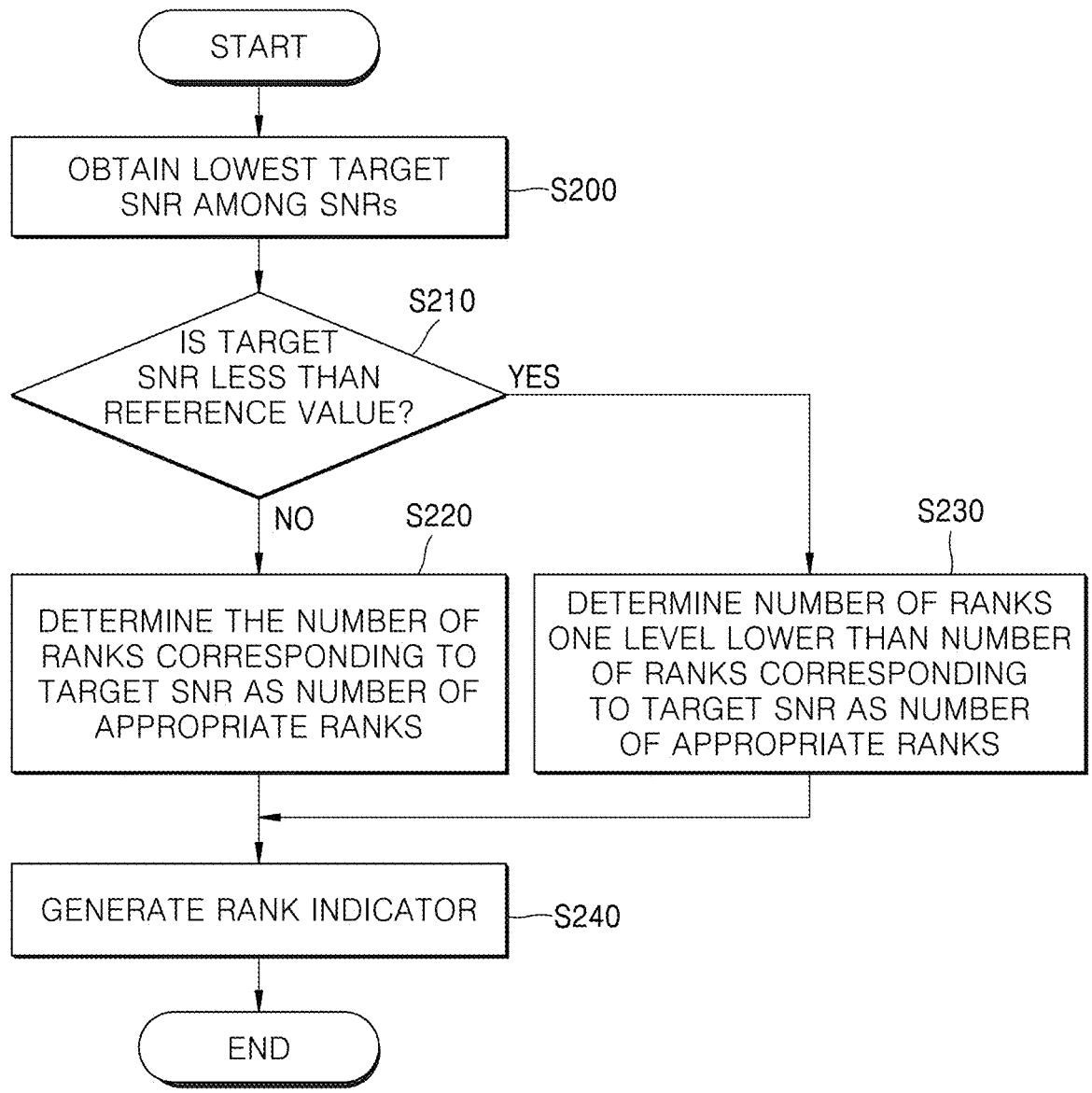
FIG. 7 is a flowchart of an operation of a rank indicator generator of FIG. 6, according to an embodiment.

FIG. 7 is a flowchart illustrating an operation of the rank indicator generator RI_G of FIG. 6, according to an embodiment;

Referring to FIGS. 6 and 7, the rank indicator generator RI_G may receive the channel state information CH_ST from the channel state meter 134a. The channel state information CH_ST may include SNRs of second channels corresponding to streams to which a beam steering matrix is applied. In operation S200, the rank indicator generator RI_G may obtain the lowest target SNR among the SNRs from the channel state information CH_ST. In operation S210, the rank indicator generator RI_G may determine whether the obtained target SNR is less than the reference value. When the result of operation S210 is 'No', in operation S220, the rank indicator generator RI_G may determine the number of ranks corresponding to the target SNR as the number of appropriate ranks. The number of ranks corresponding to the target SNR may be the number of ranks corresponding to the second channel having the target SNR. In operation S230, in response to a result of 'Yes' in operation 210, the rank indicator generator RI_G may determine the number of ranks one level (e.g., one rank) lower than the number of ranks corresponding to the target SNR as the number of appropriate ranks. In operation S240, the rank indicator generator RI_G may generate a rank indicator indicating the determined number of appropriate ranks. The beamforming feedback generator 134c' may provide the base station 10 with a beamforming feedback FB' including the rank indicator.

Figure 8:
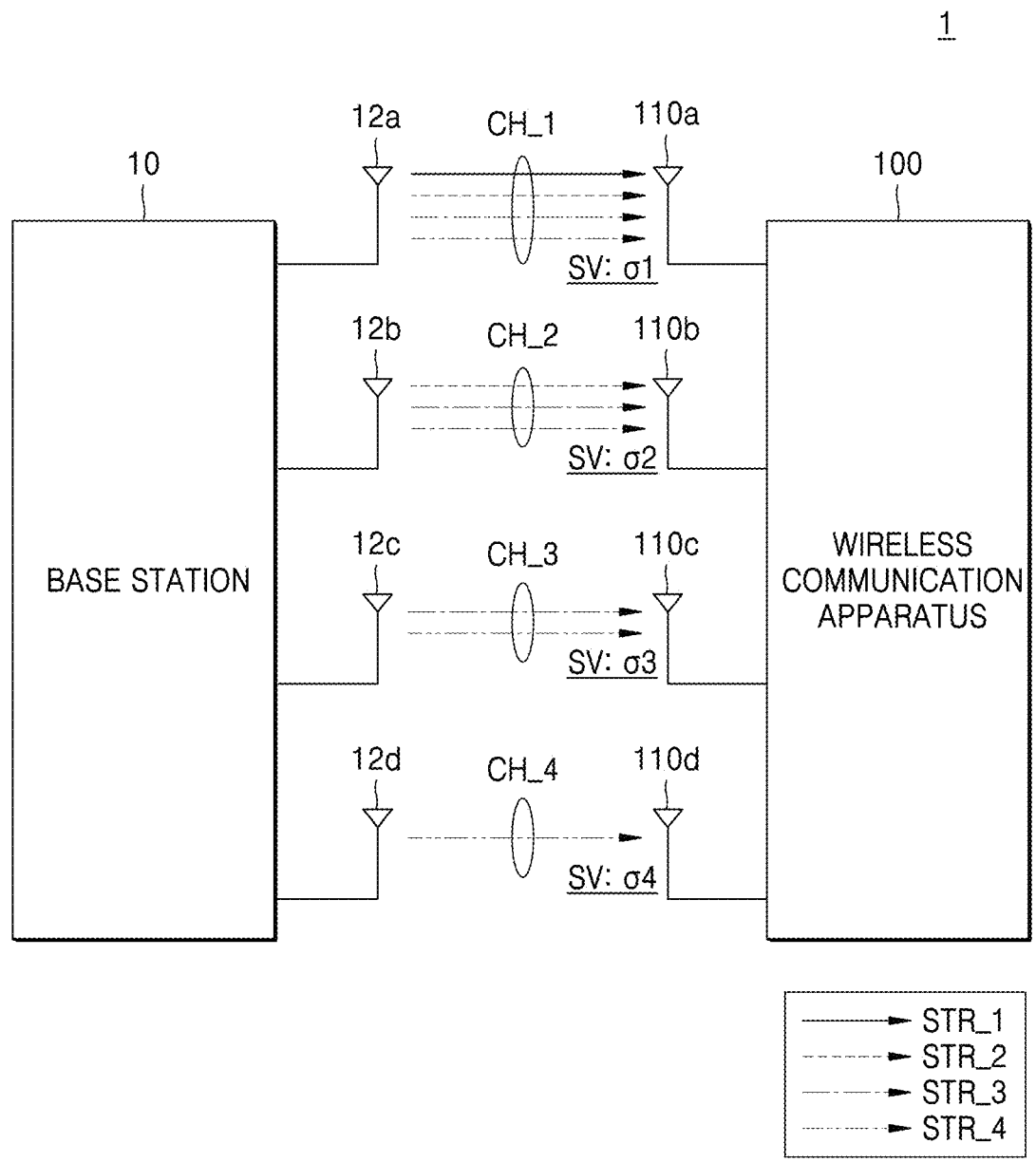
FIG. 8 is a block diagram illustrating a method of generating beamforming feedback in a wireless communication system that is a rank-4 wireless local area network system.

FIG. 8 is a block diagram illustrating a method of generating beamforming feedback in the wireless communication system 1 that is a rank-4 wireless local area network system.

Referring to FIGS. 4 and 8, the wireless communication system 1 may include the base station 10 and the wireless communication apparatus 100, wherein the base station 10 may include four transmitting antennas 12a to 12d (e.g., transmitting antenna 12a, transmitting antenna 12b, transmitting antenna 12c and transmitting antenna 12d), and the wireless communication apparatus 100 may include four receiving antennas 110a to 110d (e.g., receiving antenna 110a, receiving antenna 110b, receiving antenna 110c and receiving antenna 110d). Streams to which the beam steering matrix V is applied may include stream-1 STR_1 to stream-4 STR_4 (e.g., stream-1 STR_1, stream-2 STR_2, stream-3 STR_3 and stream-4 STR_4). Second channels respectively corresponding to the streams to which the beam steering matrix V of FIG. 8 is applied may include the channel-1 CH_1 to channel-4 CH_4 (e.g., channel-1 CH_1, channel-2 CH_2, channel-3 CH_3 and channel-4 CH_4), and the second channels CH_1 to CH_4 may be based on singular values of the diagonal matrix Σ.

The stream-1 STR_1 may be transmitted to the wireless communication apparatus 100 only through the channel-1 CH_1. Accordingly, the stream-1 STR_1 may correspond to the number of ranks of '1'. A portion of the stream-2 STR_2 may be transmitted to the wireless communication apparatus 100 through the channel-1 CH_1 and the other portion of the stream-2 STR_2 may be transmitted to the wireless communication apparatus 100 through the channel-2 CH_2. Accordingly, the stream-2 STR_2 may correspond to the number of ranks of '2'. A first portion of the stream-3 STR_3 may be transmitted to the wireless communication apparatus 100 through the channel-1 CH_1, a second portion of the stream-3 STR_3 may be transmitted to the wireless communication apparatus 100 through the channel-2 CH_2, and a third portion of the stream-3 STR_3 may be transmitted to the wireless communication apparatus 100 through the channel-3 CH_3. Accordingly, the stream-3 STR_3 may correspond to the number of ranks of '3'. A first portion of the stream-4 STR_4 may be transmitted to the wireless communication apparatus 100 through the channel-1 CH_1, a second portion of the stream-4 STR_4 may be transmitted to the wireless communication apparatus 100 through the channel-2 CH_2, a third portion of the stream-4 STR_4 may be transmitted to the wireless communication apparatus 100 through the channel-3 CH_3, and a fourth portion of the stream-4 STR_4 may be transmitted to the wireless communication apparatus 100 through the channel-4 CH_4. Accordingly, the stream-4 STR_4 may correspond to the number of ranks of '4'.

The channel-1 CH_1 may include a plurality of sub channels (also referred to herein as sub carriers), and the singular values SV respectively corresponding to the sub channels of the channel-1 CH_1 may be referred to as the first singular values σ1. In other words, the stream-1 STR_1 may be transmitted through a plurality of sub carriers corresponding to the channel-1 CH_1, and the first singular values σ1 may be the singular values SV corresponding to the sub carriers.

The channel-2 CH_2 may include a plurality of sub channels (also referred to herein as sub carriers), and the singular values SV respectively corresponding to the sub channels of the channel-2 CH_2 may be referred to as the second singular values σ2. In other words, a portion of the stream-2 STR_2 may be transmitted through a plurality of sub carriers corresponding to the channel-2 CH_2, and the second singular values σ2 may be the singular values SV respectively corresponding to the sub carriers.

The channel-3 CH_3 may include a plurality of sub channels (also referred to herein as sub carriers), and the singular values SV respectively corresponding to the sub channels of the channel-3 CH_3 may be referred to as the third singular values σ3. In other words, a portion of the stream-3 STR_3 may be transmitted through a plurality of sub carriers corresponding to the channel-3 CH_3, and the third singular values σ3 may be the singular values SV respectively corresponding to the sub carriers.

The channel-4 CH_4 may include a plurality of sub channels (also referred to herein as sub carriers), and the singular values SV respectively corresponding to the sub channels of the channel-4 CH_4 may be referred to as the fourth singular values σ4. In other words, a portion of the stream-4 STR_4 may be transmitted through a plurality of sub carriers corresponding to the channel-4 CH_4, and the fourth singular values σ4 may be the singular values SV respectively corresponding to the sub carriers.

Considering the characteristics of the second channels CH_1 to CH_4 corresponding to the streams STR_1 to STR_4 generated by applying the beam steering matrix V, the first singular values σ1, the second singular values σ2, the third singular values σ3, and the fourth singular values σ4 may be decreased in order. That is, the fourth singular values σ4 may be less than the other singular values σ1 to σ3.

The wireless communication apparatus 100 according to an embodiment may generate beamforming feedback for use in determining the number of beamforming ranks by considering the state of the channel-4 CH_4, which may negatively affect beamforming performance, among the states of the second channels CH_1 to CH_4 and may provide the generated beamforming to the base station 10. In addition, the wireless communication apparatus 100 may determine the number of appropriate ranks considering the state of the channel-4 CH_4, may generate a rank indicator, and may provide the rank indicator to the base station 10.

The channel state meter 134a according to an embodiment may calculate an SNR corresponding to the channel-1 CH_1 as the state of the channel-1 CH_1. In more detail, the channel state meter 134a may calculate a first SNR for the stream-1 STR_1 received through the channel-1 CH_1 using the first singular value(s) σ1. The channel state meter 134a may calculate an SNR corresponding to the channel-2 CH_2 as the state of the channel-2 CH_2. In more detail, the channel state meter 134a may calculate a second SNR for the stream-2 STR_2 received through the channel-2 CH_2 using the second singular value(s) σ2. The channel state meter 134a may calculate an SNR corresponding to the channel-3 CH_3 as the state of the channel-3 CH_3. In more detail, the channel state meter 134a may calculate a third SNR for the stream-3 STR_3 received through the channel-3 CH_3 using the third singular value(s) σ3. In addition, the channel state meter 134a may calculate an SNR corresponding to the channel-4 CH_4 as the state of the channel-4 CH_4. In more detail, the channel state meter 134a may calculate a fourth SNR for the stream-4 STR_4 received through the channel-4 CH_4 using the fourth singular value(s) σ4.

The channel state meter 134a may provide the channel state information CH_ST including the first SNR to the fourth SNR to the beamforming feedback generator 134c. The beamforming feedback generator 134c may generate beamforming feedback FB including the first SNR to the fourth SNR and transmit the beamforming feedback FB to the base station 10. According to some embodiments, the channel state meter 134a may generate only the fourth SNR of the channel-4 CH_4 based on the determination of the number of beamforming ranks, among the second channels CH_1 through CH_4, to provide the fourth SNR of the channel-4 CH_4 to the beamforming feedback generator 134c.

The base station 10 according to an embodiment may compare the lowest SNR of the first SNR to fourth SNR (e.g., the fourth SNR) with a reference value and may determine the number of beamforming ranks based on the comparison result. According to some example embodiments, the base station 10 may determine that the state of the channel-4 CH_4 is suitable for transmitting signals when the fourth SNR is equal to or greater than the reference value and may determine the number of beamforming ranks as '4', which is the number of ranks corresponding to the channel-4 CH_4. In addition, the base station 10 may determine that the state of the channel-4 CH_4 is not suitable for transmitting signals when the fourth SNR is less than the reference value and may determine the number of beamforming ranks as '3', which is one step (e.g., rank) lower than the number of ranks corresponding to the channel-4 CH_4. According to some embodiments, when the fourth SNR is less than the reference value, the base station 10 may first determine whether the third SNR is less than another reference value and determine the number of beamforming ranks based on the determination result.

The base station 10 according to an embodiment may calculate an average of target SNRs that are less than a first reference value among the first to fourth SNRs (e.g., in response to determining that both the first SNR and the fourth SNR are both less than the first reference value), may compare an average value of the target SNRs with a second reference value, and may determine the number of beamforming ranks based on the comparison result. For example, the base station 10 may calculate an average of the third SNR and the fourth SNR that are less than the first reference value among the first SNR to the fourth SNR, and when an average value is greater than or equal to the second reference value, may determine the number of beamforming ranks as '4', which is the number of ranks corresponding to the channel-4 CH_4. In addition, when the average value is less than the second reference value, the base station 10 may determine the number of beamforming ranks as one of '3', '2' and '1', which are lower by a specific level than the number of ranks corresponding to the channel-4 CH_4, according to a difference between the average value and the second reference value. In another embodiment, the base station 10 may determine the number of beamforming ranks based on SNRs of target channels corresponding to the number of ranks greater than a reference number among the second channels CH_1 to CH_4. For example, when the reference number is '2', the base station 10 may determine the number of beamforming ranks based on SNRs corresponding to each of channels corresponding to the two highest numbers of ranks (e.g., the channel-3 CH_3 and the channel-4 CH_4).

The reference value, the first reference value, the second reference value, and the reference number according to an embodiment may be determined based on an MIMO scheme between the base station 10 and the wireless communication apparatus 100.

Figure 9:
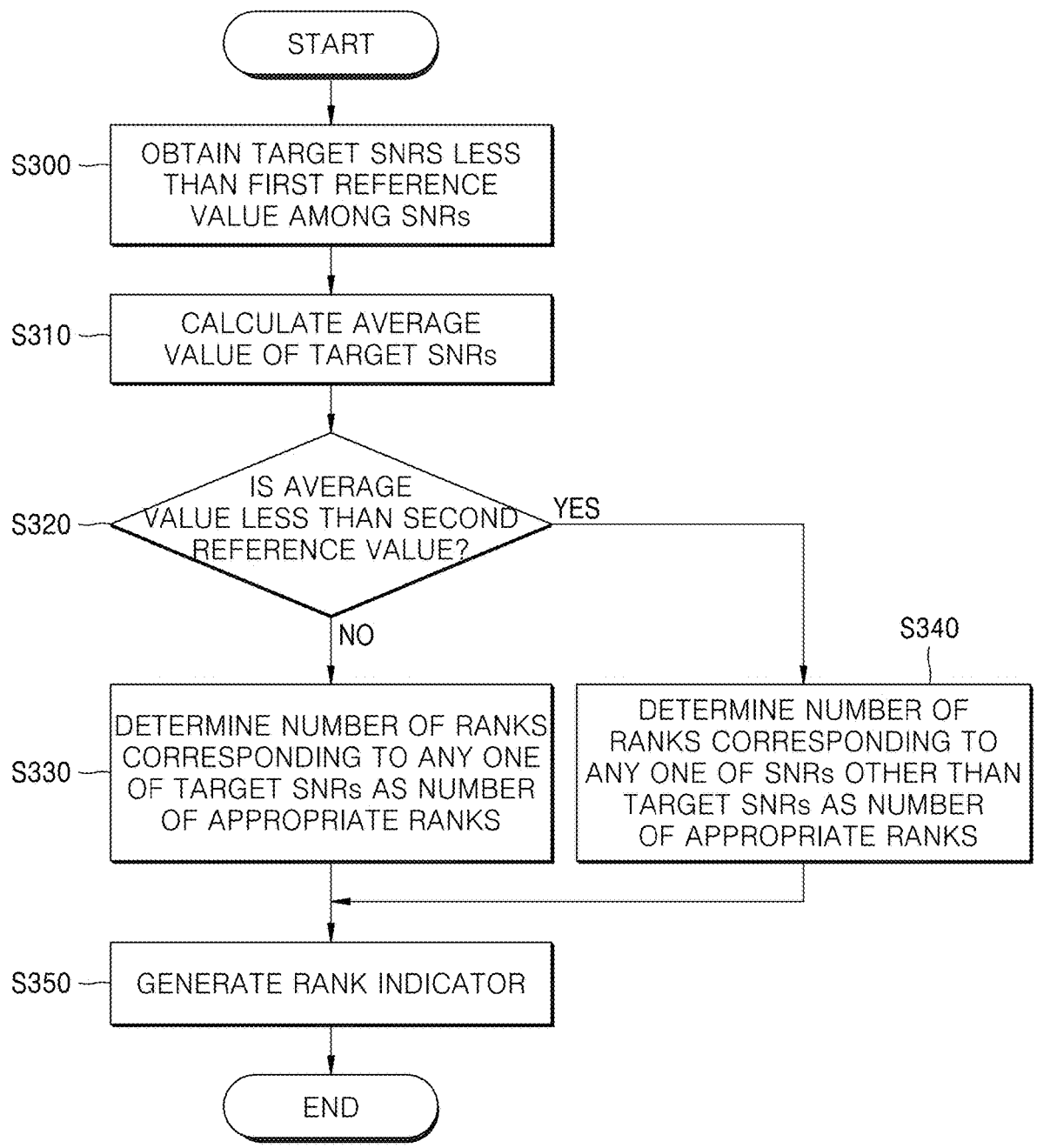
FIG. 9 is a flowchart of an operation of a rank indicator generator of FIG. 6, according to an embodiment.

FIG. 9 is a flowchart illustrating an operation of the rank indicator generator RI_G of FIG. 6, according to an embodiment.

Referring to FIGS. 6 and 9, the rank indicator generator RI_G may receive the channel state information CH_ST from the channel state meter 134a. The channel state information CH_ST may include SNRs of second channels corresponding to streams to which the beam steering matrix is applied. In operation S300, the rank indicator generator RI_G may obtain target SNRs that are less than a first reference value among the SNRs from the channel state information CH_ST. In operation S310, the rank indicator generator RI_G may calculate an average value of the target SNRs. In operation S320, the rank indicator generator RI_G may determine whether the calculated average value is less than the second reference value. When the result of operation S320 is 'No', in operation S330, the rank indicator generator RI_G may determine the number of ranks corresponding to any one of the target SNRs as the number of appropriate ranks. Otherwise, when the result of operation S320 is 'Yes', in operation S340, the rank indicator generator RI_G may determine the number of ranks corresponding to any one of SNRs other than the target SNRs as the number of appropriate ranks. In operation S350, the rank indicator generator RI_G may generate a rank indicator indicating the determined number of appropriate ranks. The beamforming feedback generator 134c' may provide a base station with the beamforming feedback FB' including the rank indicator. In another embodiment, the rank indicator generator RI_G may determine the number of appropriate ranks based on SNRs of target channels corresponding to the number of ranks greater than a reference number among the second channels and may generate a rank indicator indicating the determined number of appropriate ranks.

Figure 10A:
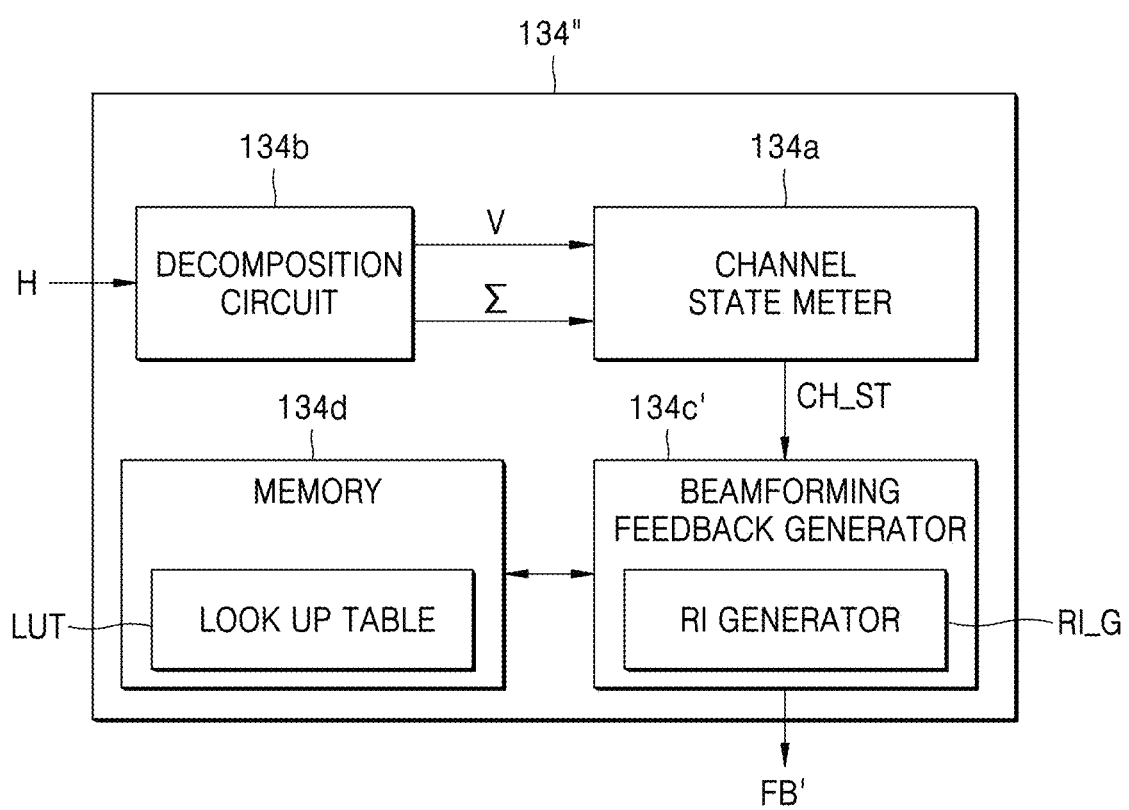
FIG. 10A is a block diagram of an operation of a link adaptor according to an embodiment.
Figure 10B:
FIG. 10B is a view of a look-up table of FIG. 10A.

FIG. 10A is a block diagram of an operation of the link adaptor 134" according to an embodiment, and FIG. 10B is a view of a look-up table LUT of FIG. 10A. The link adaptor 134" of FIG. 10A is the same as or similar to the link adaptor 134' of FIG. 6, with the exception of a memory 134d of FIG. 10A. Redundant description between FIGS. 3, 6 and 10A is omitted.

Referring to FIG. 10A, the link adaptor 134" may further include the memory 134d, compared to FIGS. 3 and 6. However, this is only an embodiment, and the inventive concepts are not limited thereto. The memory 134d may be located outside the link adaptor 134". The memory 134d may store the look-up table LUT in which reference values, used when the rank indicator generator RI_G determines a proper rank indicator, are arranged according to the MIMO scheme.

Further referring to FIG. 10B, in the look-up table LUT, a reference value may be preset or set according to the number of transmitting antennas NTX of a base station (e.g., the base station 10) used for MIMO and the number of receiving antennas NRX of a wireless communication apparatus (e.g., the wireless communication apparatus 100). For example, the reference value may be 'TH1' when the MIMO scheme is '2×2', may be 'TH2' when the MIMO scheme is '4×2', and may be 'TH3' when the MIMO scheme is '4×4'.

The rank indicator generator RI_G according to an embodiment may obtain a reference value corresponding to the current MIMO scheme with reference to the look-up table LUT and may determine the number of appropriate ranks by applying the reference value to the channel state information CH_ST. The rank indicator generator RI_G may generate a rank indicator based on the determined number of ranks.

However, the look-up table LUT of FIG. 10B is merely an embodiment, and some example embodiments are not limited thereto. A first reference value and a second reference value described with reference to FIG. 8 and the like may also be arranged in the look-up table LUT according to the MIMO scheme. Furthermore, various reference values (e.g., the reference number) that may be used by the rank indicator generator RI_G to determine the number of appropriate ranks according to the inventive concepts may be arranged in the look-up table LUT.

Figure 11:
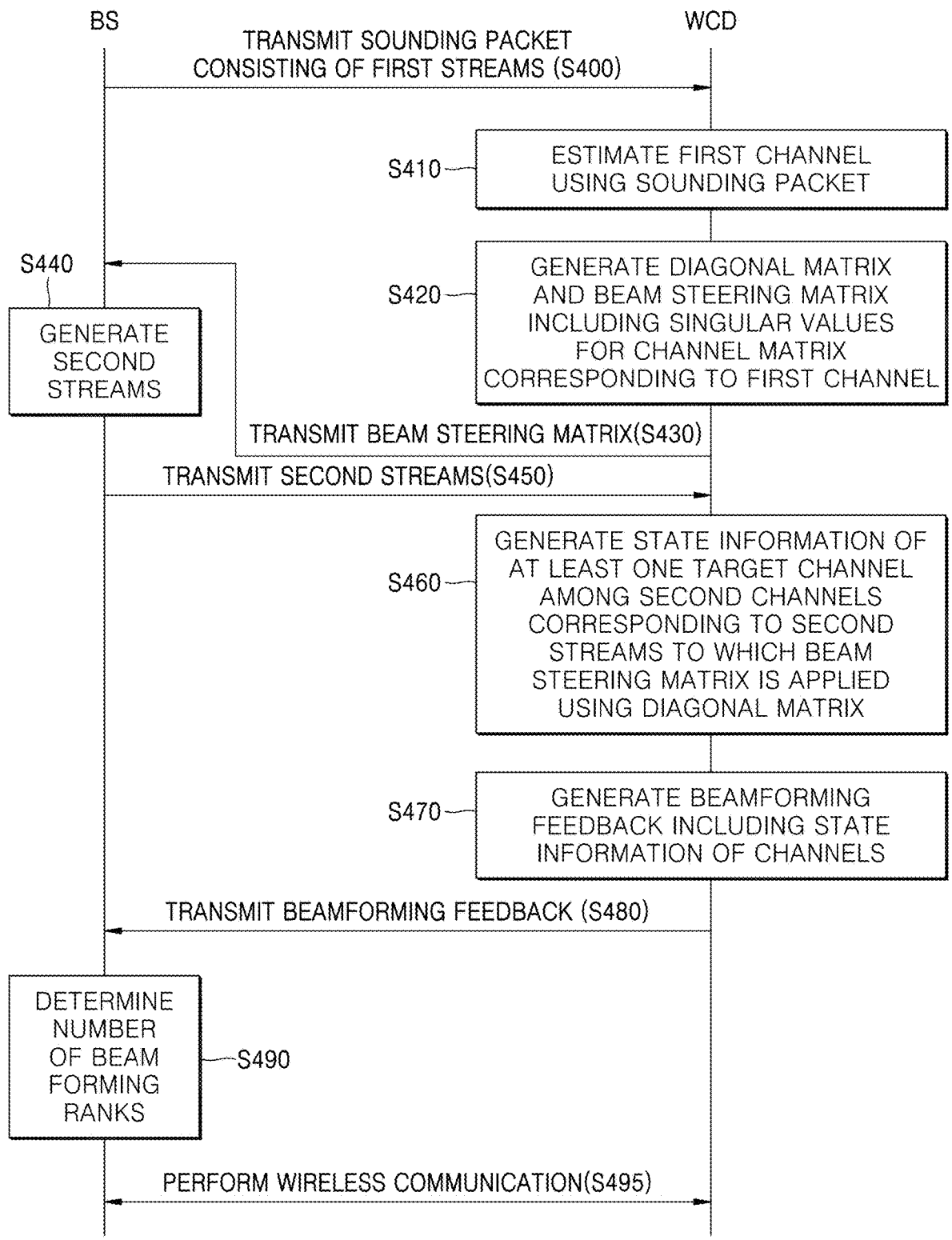
FIG. 11 is a flowchart illustrating a method of operating a wireless communication system, according to an embodiment.

FIG. 11 is a flowchart illustrating a method of operating a wireless communication system (e.g., the wireless communication system 1), according to an embodiment.

Referring to FIG. 11, in operation S400, a base station BS (e.g., the base station 10) may transmit a sounding packet consisting of first streams to a wireless communication apparatus WCD (e.g., the wireless communication apparatus 100). In operation S410, the wireless communication apparatus WCD may estimate a first channel using the sounding packet. In operation S420, the wireless communication apparatus WCD may generate a diagonal matrix and a beam steering matrix including singular values for a channel matrix corresponding to the estimated first channel. According to some example embodiments, in operation S430, the wireless communication apparatus WCD may transmit the beam steering matrix and/or the diagonal matrix (also referred to as "first beamforming feedback") to the base station BS. According to some example embodiments, in operation S440, the base station BS may generate a plurality of second streams by applying the beam steering matrix to the first streams using the diagonal matrix. According to some example embodiments, the base station BS may generated the second streams by applying the beam steering matrix to the first streams using the diagonal matrix using structures and/or methods that would be known to a person having ordinary skill in the art. According to some example embodiments, in operation S450, the base station may transmit the second streams over a plurality of second channels to the wireless communication apparatus WCD. In operation S460, the wireless communication apparatus WCD may generate state information of at least one target channel among second channels corresponding to the second streams to which the beam steering matrix is applied using the diagonal matrix. In operation S470, the wireless communication apparatus WCD may generate beamforming feedback including state information of channels and/or a rank indicator. In operation S480, the wireless communication apparatus WCD may transmit beamforming feedback (also referred to as "second beamforming feedback") to the base station BS. According to some example embodiments, in operation S490, the base station BS may determine a number of beamforming ranks based on the beamforming feedback (e.g., the second beamforming feedback). According to some example embodiments, in operation S495, the base station BS may perform wireless communication with the wireless communication apparatus WCD (e.g., MIMO communication) based on the number of beamforming ranks. For example, the base station BS may transmit one or more third signals to the wireless communication apparatus WCD over one or more third channels selected based on the number of beamforming ranks. The wireless communication apparatus may receive and decode the one or more third signals. According to some example embodiments, the operations S400 to S495 may be performed iteratively.

Figure 12:
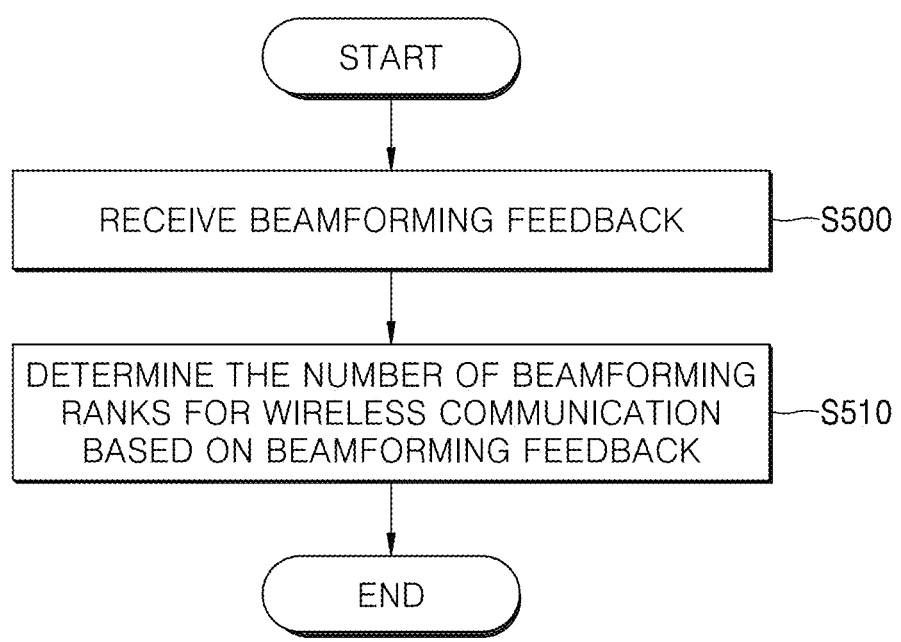
FIG. 12 is a flowchart illustrating a method of operating a base station, according to an embodiment.

FIG. 12 is a flowchart illustrating a method of operating a base station (e.g., the base station 10), according to an embodiment.

Referring to FIG. 12, in operation S500, the base station may receive beamforming feedback from a wireless communication apparatus (e.g., the wireless communication apparatus 100). In operation S510, the base station may determine the number of beamforming ranks for wireless communication based on the beamforming feedback. According to some example embodiments, the base station may determine the number of beamforming ranks of the base station the same operations or operations similar to those described above.

Figure 13:
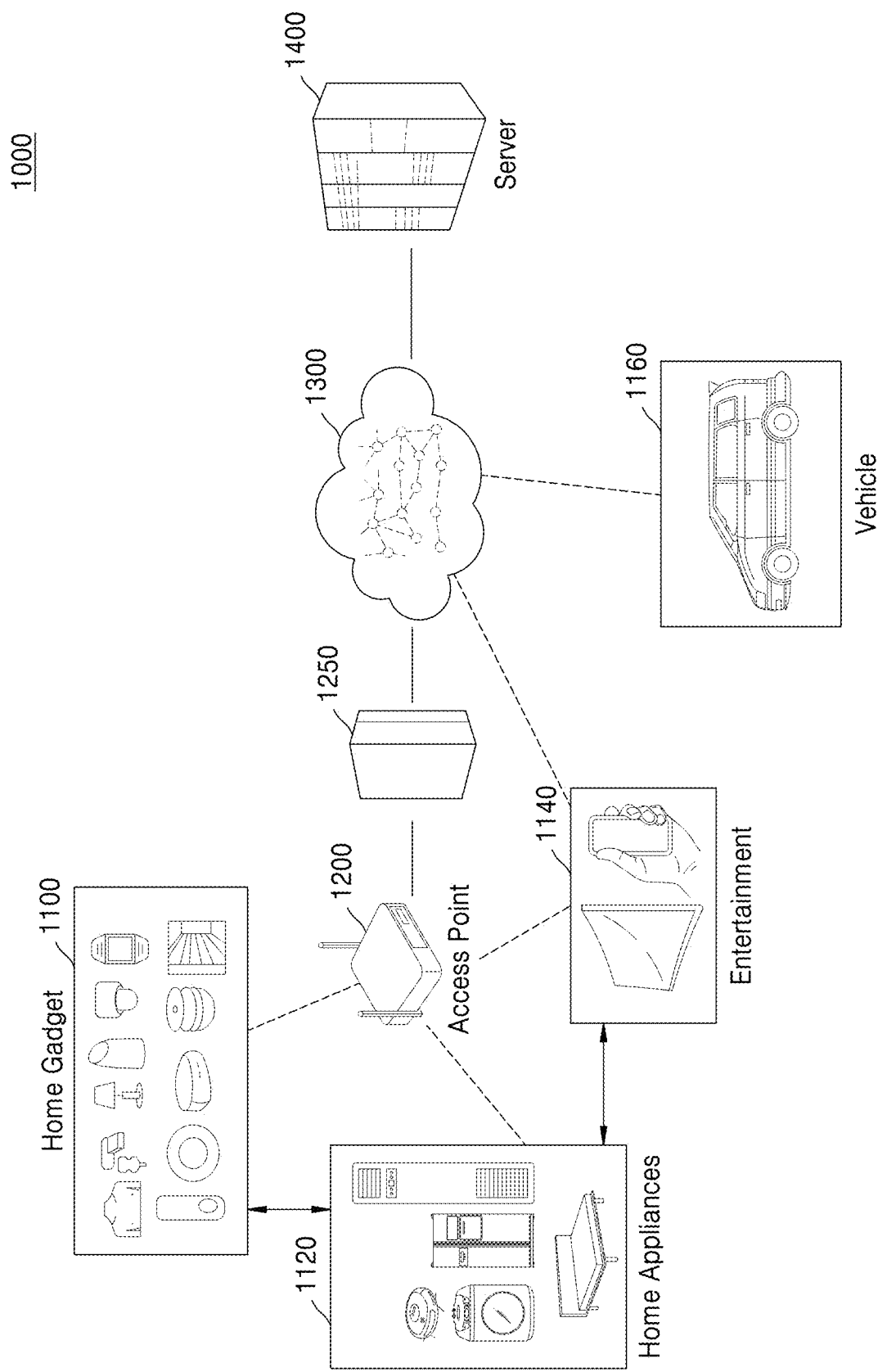
FIG. 13 is a conceptual diagram of an Internet of Things (IoT) network system, according to an embodiment.

FIG. 13 is a conceptual diagram of an Internet of Things (IoT) network system 1000, according to an embodiment.

Referring to FIG. 13, the IoT network system 1000 may include a plurality of IoT devices 1100, 1120, 1140, and/or 1160 (e.g., the wireless communication apparatus 100), an AP 1200, a gateway 1250, a wireless network 1300, and/or a server 1400. IoT may indicate a network between things using wired and/or wireless communication.

Each of the IoT devices 1100, 1120, 1140, and/or 1160 may form a group according to characteristics thereof. For example, each of the IoT devices may be grouped into a home gadget group 1100, a household appliances/furniture group 1120, an entertainment group 1140, and/or a vehicle group 1160. The IoT devices 1100, 1120, and/or 1140 may be connected to a communication network and/or another IoT device through the AP 1200. The AP 1200 may be built (e.g., included) in one of the IoT devices. The gateway 1250 may change a protocol to connect the AP 1200 to an external wireless network. The IoT devices 1100, 1120, and/or 1140 may be connected to the external communication network through the gateway 1250. The wireless network 1300 may include the Internet and/or a public network. The plurality of IoT devices 1100, 1120, 1140, and/or 1160 may be connected to the server 1400 that provides a certain service through the wireless network 1300, and a user may use the service through at least one of the plurality of IoT devices 1100, 1120, 1140, and/or 1160.

According to embodiments, each of the plurality of IoT devices 1100, 1120, 1140, and/or 1160 may include processing circuitry (e.g., a processor). The processing circuitry of each of the plurality of IoT devices 1100, 1120, 1140, and/or 1160 may generate beamforming feedback that may be used to determine the number of beamforming ranks by selectively and/or preferentially checking a channel state that may adversely affect the performance of beamforming for wireless communication between the IoT devices 1100, 1120, 1140, and/or 1160 and the AP 1200 and/or the wireless network 1300. The processing circuitry of each of the plurality of IoT devices 1100, 1120, 1140, and/or 1160 may transmit the beamforming feedback to the AP 1200 and/or the wireless network 1300. A base station (e.g., base station 10) connected to the AP 1200 and/or the wireless network 1300 may determine the number of beamforming ranks based on the beamforming feedback.

Figure 14:
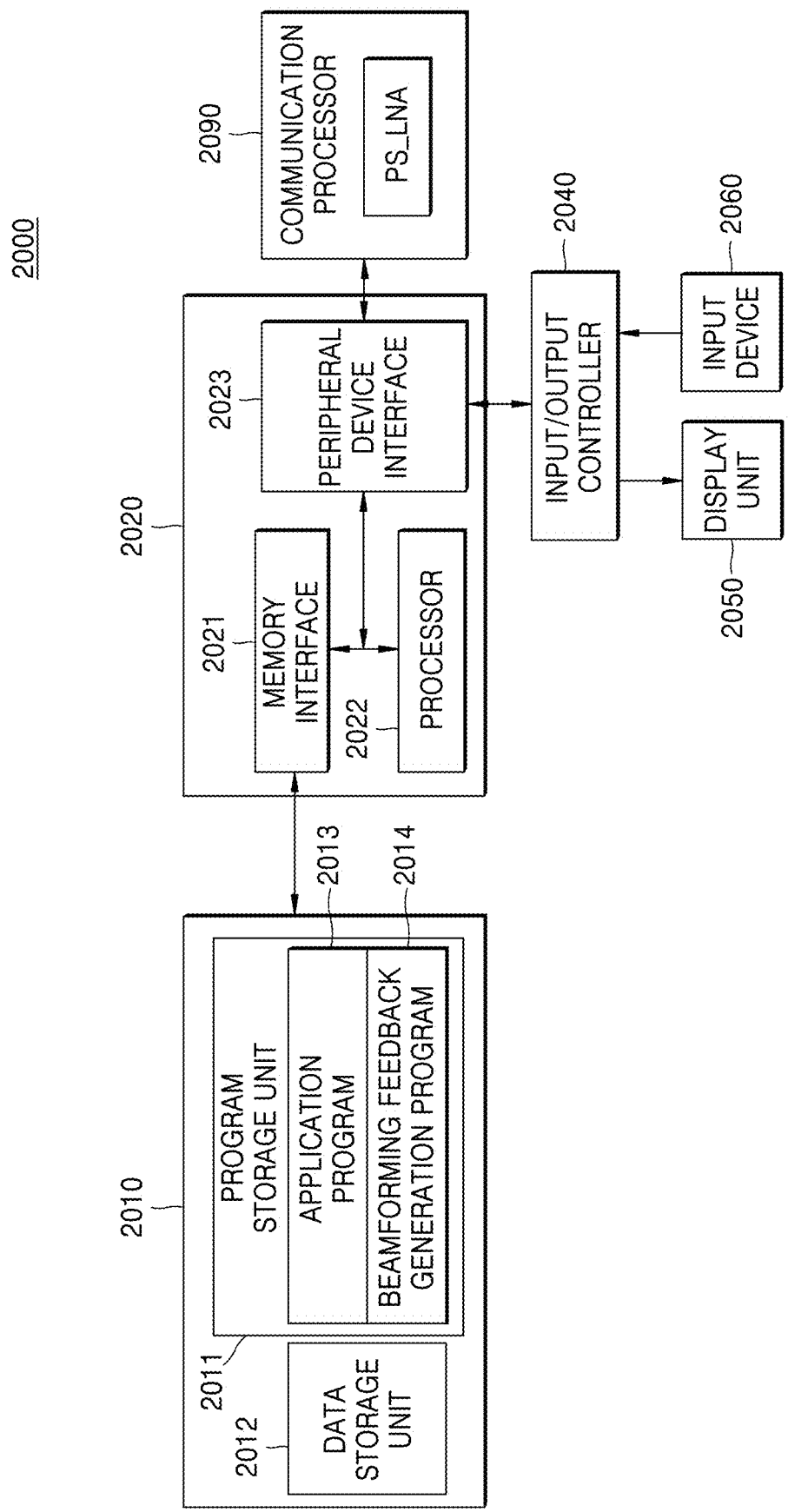
FIG. 14 is a block diagram of an electronic device according to an embodiment.

FIG. 14 is a block diagram of an electronic device 2000 according to an embodiment.

Referring to FIG. 14, the electronic device 2000 (e.g., the wireless communication apparatus 100) may include a memory 2010, a processor unit 2020, an input/output controller 2040, a display unit 2050, an input device 2060, and/or a communication processor 2090. Here, a plurality of memories 2010 may be included.

The memory 2010 may include a program storage unit 2011 for storing a program for controlling operations of the electronic device 2000 and a data storage unit 2012 for storing data generated during program execution. The data storage unit 2012 may store data used for operations of an application program 2013 and/or a beamforming feedback generation program 2014. The program storage unit 2011 may include the application program 2013 and the beamforming feedback generation program 2014. Here, the programs included (e.g., stored) in the program storage unit 2011 may be sets of instructions, which may be expressed as instruction sets.

The application program 2013 includes an application program running on the electronic device 2000. That is, the application program 2013 may include instructions of an application driven by processing circuitry (e.g., a processor 2022). The beamforming feedback generation program 2014, according to embodiments, may generate beamforming feedback that may be used to determine the number of beamforming ranks by selectively and/or preferentially checking a channel state that may adversely affect the performance of beamforming for wireless communication.

A peripheral device interface 2023 may control connection of the processing circuitry and/or a memory interface 2021 to an input/output peripheral device of a base station (e.g., the base station 10). The processing circuitry may control the base station to provide a corresponding service using at least one software program. The processing circuitry may execute at least one program stored in the memory 2010 (e.g., via the memory interface 2021) to provide a service corresponding to the program.

The input/output controller 2040 may provide an interface between an input/output device such as the display unit 2050 and/or the input device 2060 and the peripheral device interface 2023. The display unit 2050 may display state information, input characters, moving pictures, still pictures, and/or the like. For example, the display unit 2050 may display application program information driven (e.g., output) by the processor 2022.

The input device 2060 may provide input data generated by a selection of (e.g., input into) the electronic device 2000 to the processor unit 2020 through the input/output controller 2040. The input device 2060 may include a keypad including at least one hardware button and/or a touchpad for sensing touch information. For example, the input device 2060 may provide touch information such as a touch, a touch movement, and/or a touch release sensed through a touchpad to the processor 2022 through the input/output controller 2040. The electronic device 2000 may include the communication processor 2090 that may perform a communication function for voice communication and/or data communication.

Example embodiments have been illustrated and described in the drawings and the detailed description as described above. Although specific terms are used to explain embodiments in the present disclosure, the specific terms are not intended to restrict the scope of the inventive concepts and are only used for a better understanding of the inventive concepts. It will be understood by one of ordinary skill in the art that various changes in form and details may be made without departing from the spirit and scope of the inventive concepts as defined by the below claims. Therefore, the scope of the inventive concepts are defined not by the detailed description of the inventive concepts but by the below claims.

What is claimed is:

1. A method of operating a wireless communication apparatus, the method comprising:
    estimating a first channel using a sounding packet received from a base station to obtain an estimated first channel, the sounding packet including a plurality of first streams;
    generating a diagonal matrix and a beam steering matrix by performing singular value decomposition (SVD) on the estimated first channel;
    generating state information of a plurality of second channels respectively corresponding to a plurality of second streams generated by applying the beam steering matrix to the plurality of first streams using the diagonal matrix; and
    transmitting beamforming feedback based on the state information to the base station.

2. The method of claim 1, wherein the generating state information further comprises:
    determining a plurality of signal to noise ratios (SNRs) by obtaining a plurality of singular values corresponding to the plurality of second channels from the diagonal matrix, each of the plurality of second channels corresponding to a respective SNR among the plurality of SNRs, and each of the plurality of singular values corresponding to a respective second channel among the plurality of second channels.

3. The method of claim 2, wherein the determining determines a plurality of SNRs such that a subset of the plurality of SNRs are referenced to determine a number of beamforming ranks.

4. The method of claim 3, wherein the determining determines a plurality of SNRs such that a lowest target SNR among the plurality of SNRs is referenced to determine the number of beamforming ranks.

5. The method of claim 3, wherein the determining a plurality of SNRs such that a plurality of target SNRs among the plurality of SNRs equal to or less than a reference value are referenced to determine the number of beamforming ranks.

6. The method of claim 2, further comprising:
    generating a rank indicator indicating a number of appropriate ranks for wireless communication based on the state information.

7. The method of claim 6, the generating a rank indicator further comprises:
    comparing a lowest target SNR among the plurality of SNRs with a reference value; and
    determining the number of appropriate ranks based on a number of ranks corresponding to the lowest target SNR based on a result of the comparing.

8. The method of claim 6, wherein the generating a rank indicator further comprises:

calculating an average value of a plurality of target SNRs among the plurality of SNRs that are less than a first reference value;

comparing the average value with a second reference value; and determining the number of appropriate ranks based on a number of ranks corresponding to each of the plurality of target SNRs and a result of the comparing.

9. The method of claim 1, wherein the state information includes a plurality of channel states, each respective channel state among the plurality of channel states corresponding to one of the plurality of second channels; and the method further comprises generating a rank indicator based on a particular second channel among the plurality of second channels corresponding to a particular channel state among the plurality of channel states less than a reference value.

10. The method of claim 9, wherein the beamforming feedback includes the rank indicator.

11. The method of claim 9, further comprising:

determining the reference value based on a multiple input multiple output (MIMO) scheme between the base station and the wireless communication apparatus.

12. The method of claim 1, wherein each of the plurality of first streams is modulated and encoded using a same modulation and coding scheme.

13. A method of operating a wireless communication apparatus, the method comprising:

generating a diagonal matrix and a beam steering matrix by performing singular value decomposition on a channel matrix corresponding to a first channel between a base station and the wireless communication apparatus, the diagonal matrix including a plurality of singular values;

determining a plurality of signal to noise ratios (SNRs) corresponding to a plurality of second channels over which are received a plurality of beam steering streams to which the beam steering matrix is applied using the diagonal matrix; and providing beamforming feedback including the plurality of SNRs and the beam steering matrix to the base station.

14. The method of claim 13, further comprising:

receiving a sounding packet including a plurality of sounding streams from the base station; and generating the channel matrix by estimating the first channel using a reference signal included in the sounding packet.

15. The method of claim 13, wherein the determining a plurality of SNRs further comprises:

determining an $N^{th}$ SNR corresponding to an Nth channel among the plurality of second channels based on a plurality of singular values corresponding to a plurality of sub carriers included in the Nth channel, N being an integer of 1 or more.

16. The method of claim 13, further comprising:

generating a rank indicator indicating a number of appropriate ranks of the wireless communication apparatus based on an SNR of a target channel among the plurality of second channels corresponding to a largest number of ranks and a reference value.

17. The method of claim 16, the generating a rank indicator comprises:

determining the number of appropriate ranks to be one rank lower than a number of ranks corresponding to the target channel in response to the SNR of the target channel being less than the reference value.

18. The method of claim 16, wherein the reference value is based on a number of antennas of the base station and a number of antennas of the wireless communication apparatus used for multiple input multiple output (MIMO).

19. The method of claim 13, further comprising:

generating a rank indicator indicating a number of appropriate ranks of the wireless communication apparatus based on a subset of the plurality of SNRs associated with a plurality of target channels among the plurality of second channels corresponding to a number of ranks greater than a reference number.

20. A wireless communication apparatus comprising:

a plurality of antennas configured to support beamforming; and processing circuitry configured to, estimate a first channel using a sounding packet received from a base station, the sounding packet including a plurality of first streams to obtain an estimated first channel, perform singular value decomposition on the estimated first channel to generate a diagonal matrix and a beam steering matrix, generate state information of at least one target channel among a plurality of second channels corresponding to a plurality of second streams generated by applying the beam steering matrix to the plurality of first streams such that the state information is usable for determining a number of beamforming ranks, and generate beamforming feedback based on the state information for transmission to the base station.

* * * * *